United States Patent [19]
Takahashi et al.

[11] Patent Number: 5,579,132
[45] Date of Patent: Nov. 26, 1996

[54] IMAGE PROCESSING SYSTEM AND METHOD FOR FAITHFULLY REPRODUCING COLORS OF OBJECT FROM NEGATIVE FILM

[75] Inventors: Koji Takahashi; Noboru Sasaki, both of Minami-ashigara, Japan

[73] Assignee: Fuji Photo Film Co., Ltd., Kanagawa, Japan

[21] Appl. No.: 117,666

[22] Filed: Sep. 8, 1993

[30] Foreign Application Priority Data

Sep. 8, 1992 [JP] Japan .................. 4-264114

[51] Int. Cl.$^6$ ........................... H04N 1/54
[52] U.S. Cl. ........................ 358/527; 358/519
[58] Field of Search ................... 348/659, 661; 358/500, 515, 518, 519, 527; 430/543, 957; 355/35, 38; H04N 1/46, 1/54

[56] References Cited

U.S. PATENT DOCUMENTS

| | | | |
|---|---|---|---|
| 4,841,362 | 6/1989 | Urabe et al. | 358/527 |
| 4,893,178 | 1/1990 | Matama et al. | 358/527 |
| 4,967,266 | 10/1990 | Yamamoto | 358/527 |
| 5,053,866 | 10/1991 | Johnson | 358/518 |
| 5,057,405 | 10/1991 | Shiba et al. | 430/363 |
| 5,254,441 | 10/1993 | Pearce et al. | 430/957 |
| 5,256,529 | 10/1993 | Romanet et al. | 430/957 |
| 5,285,271 | 2/1994 | Gennetten | 358/527 |
| 5,335,096 | 8/1994 | Shimazaki | 358/518 |

*Primary Examiner*—Kim Vu
*Attorney, Agent, or Firm*—Sughrue, Mion, Zinn, Macpeak & Seas

[57] ABSTRACT

An image of an object is fixed on a color negative film, the object image on the film is converted into an analog signal for each pixel by use of a scanner, and the analog signal is output to a demodulation processing section. The demodulation processing section demodulates color information of the object from the analog signal and outputs the same to an image processing section. The image processing section subjects the color information to an aesthetic color correction process, if necessary, and displays an image having substantially the same color as that of the object on a color CRT. Further, an output circuit receives the color information from the image processing section, subjects the same to a preset process so as to create a color dye signal indicating the densities of color materials and outputs the color dye signal to a color printer. The color printer creates an image on a medium based on the color dye signal.

15 Claims, 9 Drawing Sheets

PERSON'S VISUAL RESPONSE TO LIGHT

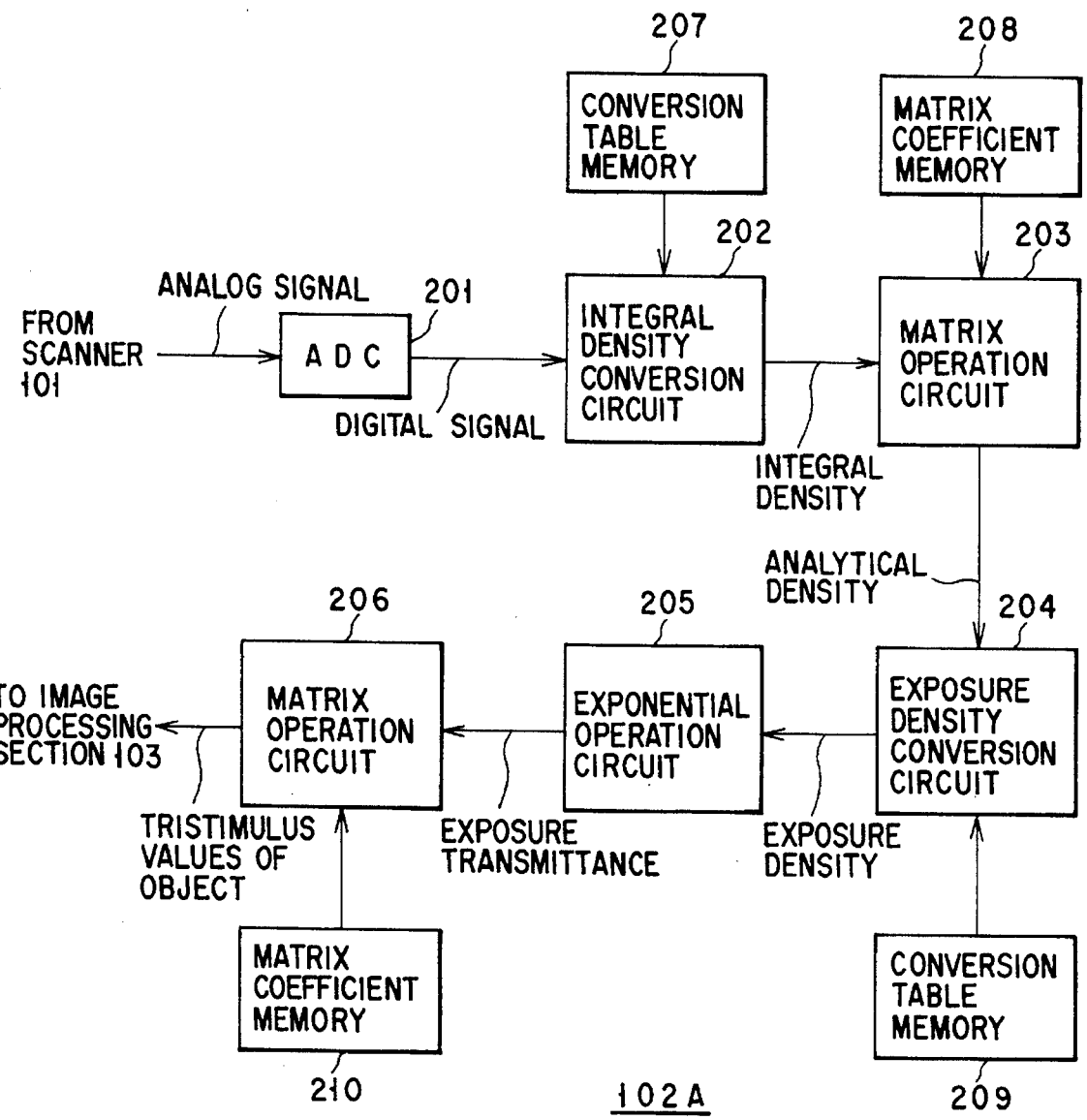
F I G. 5

DENSITY CONVERSION TABLE FOR R

| R-DIGITAL VALUE | DENSITY |
|---|---|
| 0 0 0 0 0 0 0 0 | DR0 |
| 0 0 0 0 0 0 0 1 | DR1 |
| 0 0 0 0 0 0 1 0 | DR2 |
| ⋮ | ⋮ |

FIG. 7A

DENSITY CONVERSION TABLE FOR G

| G-DIGITAL VALUE | DENSITY |
|---|---|
| 0 0 0 0 0 0 0 0 | DG0 |
| 0 0 0 0 0 0 0 1 | DG1 |
| 0 0 0 0 0 0 1 0 | DG2 |
| ⋮ | ⋮ |

FIG. 7B

DENSITY CONVERSION TABLE FOR B

| B-DIGITAL VALUE | DENSITY |
|---|---|
| 0 0 0 0 0 0 0 0 | DB0 |
| 0 0 0 0 0 0 0 1 | DB1 |
| 0 0 0 0 0 0 1 0 | DB2 |
| ⋮ | ⋮ |

FIG. 7C

DENSITY CONVERSION TABLE FOR R

| ANALYTICAL DENSITY Dc (CYAN) | EXPOSURE DENSITY |
|---|---|
| 0.01 | Dr1 |
| 0.02 | Dr2 |
| ⋮ | ⋮ |
| 2.55 | Dr255 |

FIG. 8A

DENSITY CONVERTION TABLE FOR G

| ANALYICAL DENSITY Dm (MAGENTA) | EXPOSURE DENSITY |
|---|---|
| 0.01 | Dg1 |
| 0.02 | Dg2 |
| ⋮ | ⋮ |
| 2.55 | Dg255 |

FIG. 8B

DENSITY CONVERSION TABLE FOR B

| ANALYICAL DENSITY Dy (YELLOW) | EXPOSURE DENSITY |
|---|---|
| 0.01 | Db1 |
| 0.02 | Db2 |
| ⋮ | ⋮ |
| 2.55 | Db255 |

FIG. 8C

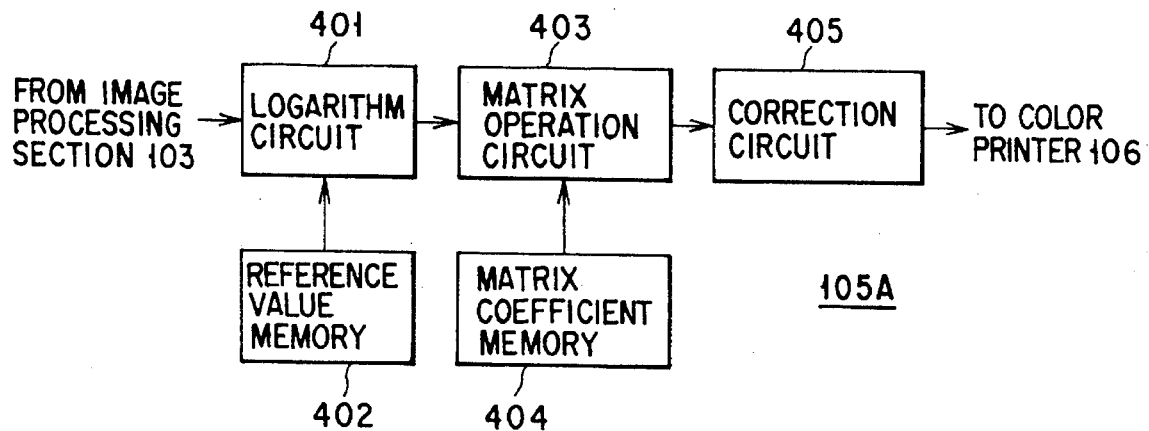
F I G. 11
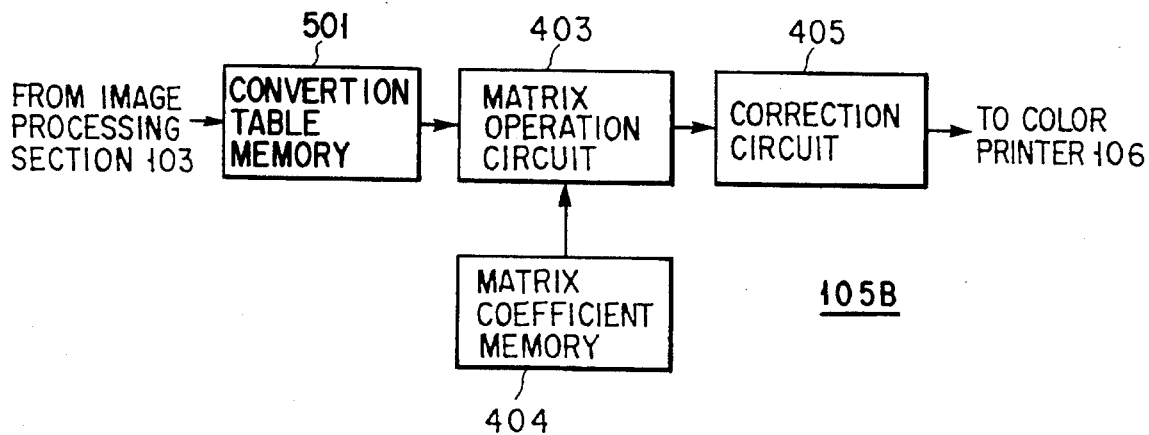
F I G. 12

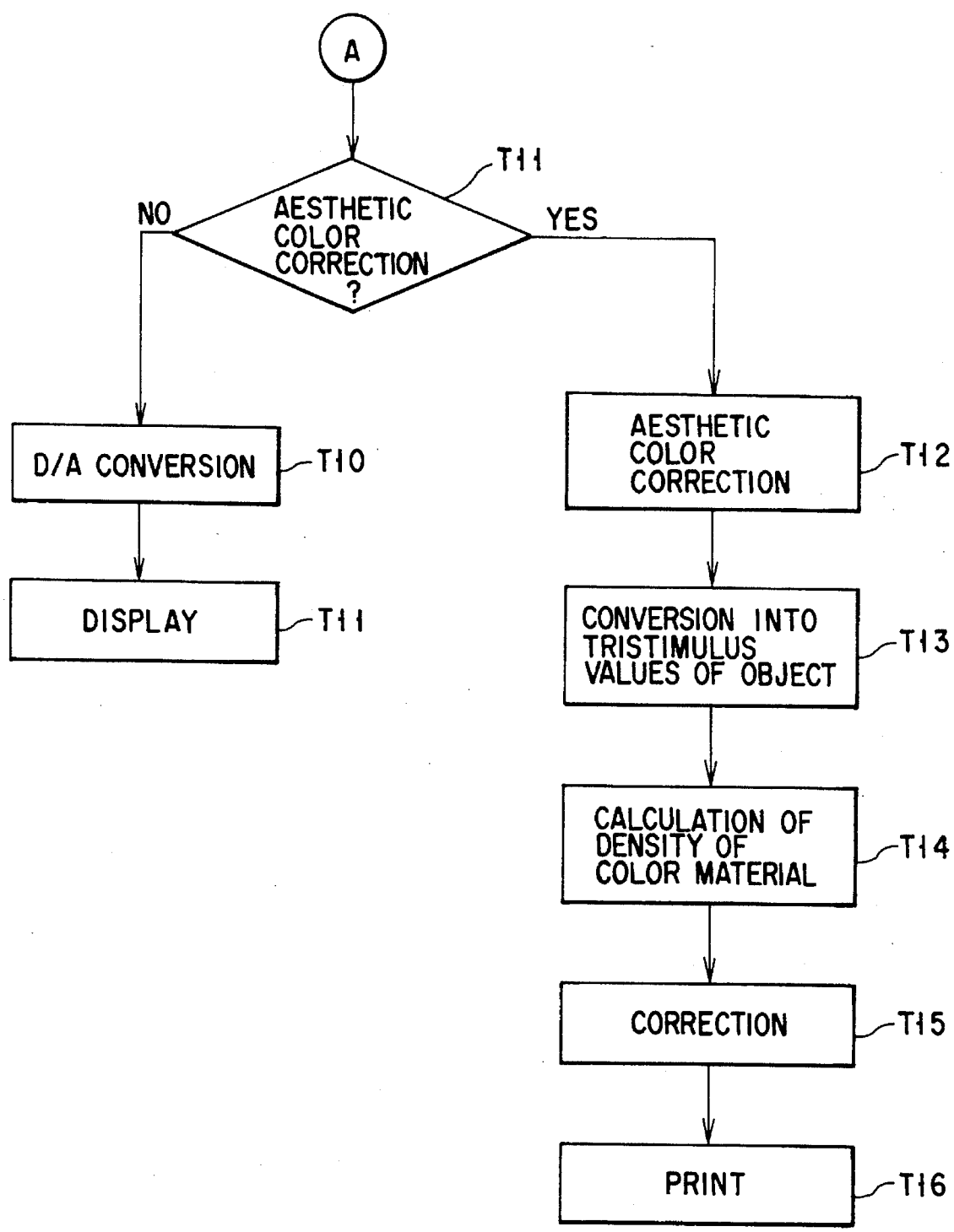
F I G. 13 B

IMAGE PROCESSING SYSTEM AND METHOD FOR FAITHFULLY REPRODUCING COLORS OF OBJECT FROM NEGATIVE FILM

BACKGROUND OF THE INVENTION

1. Field of the Invention

This invention relates to an image processing system and method for creating an image of an object by subjecting an image recorded on a color negative film to the digital image process to faithfully reproduce the colors thereof.

2. Description of the Related Art

In color photographs, it is desired to reproduce colors (hues) which match with the person's impressions. The spectral sensitivity of a color film plays an important role for faithfully reproducing the colors. As the ideal spectral sensitivity, the spectral sensitivity based on the person's visual response to light shown in FIG. 1 is known. The spectral sensitivities for blue, green and red are close to one another and indicate large negative values in a wavelength range of 490 nm to 530 nm.

When it is intended to achieve the spectral sensitivity corresponding to the visual response to light shown in FIG. 1, particularly, the negative sensitivity only by use of a color film, the structure of the color film becomes extremely complex. Further, the chemical image processing attained by use of the color film has a limitation, and it is practically impossible to precisely realize the spectral sensitivity corresponding to the visual response shown in FIG. 1, particularly, the negative sensitivity by use of a color film.

SUMMARY OF THE INVENTION

It is considered from the above-described circumstances to separate the image taking function and color correction (color reproduction) function of the conventional color film from each other, mainly use the color film to effect the image taking function and use a digital image processing device which is independent from the color film to effect the color correction. According to this method, since the color correction function becomes unnecessary for the color film, the structure of the color film can be made extremely simple. Further, it can be expected to enhance the precision and the degree of freedom of the color correction by use of the digital image processing device and simplify the image processing operation.

An object of this invention is to provide an image processing system and method capable of faithfully reproducing the color of an object by use of a color film with a simple structure and an image processing device.

The above object can be attained by an image processing system comprising input converting means for reading an image of an object fixed on a film and converting the image into a corresponding signal; demodulating means connected to the input converting means, for demodulating a colorimetric signal indicating colorimetric information of the object in response to the signal; and output means connected to the demodulating means, for outputting an image having substantially the same as that of the object based on the colorimetric signal color.

A film used in the image processing system includes three photosensitive layers each of which develops a single color corresponding to cyan, magenta or yellow according to the amount of exposure light, for example, the colorimetric quality factor of the spectral sensitivity of the photosensitive layer is set to be equal to or larger than 0.9, and it does not contain a colored coupler and DIR coupler (Development-Inhibitor-Releasing coupler).

An image processing method of this invention comprises the steps of developing colors of cyan, magenta and yellow according to an amount of exposure light and fixing an image of an object on a film in which all the spectral sensitivity takes a positive value and a quality factor indicating the matching degree between the spectral sensitivity and the person's visual response takes a value not less than 0.9; converting the object image on the film into corresponding image data; demodulating color information of the object based on the image data; and outputting an image having substantially the same colors as those of the object based on the color information.

With the above construction, the input converting means includes a scanner for reading an image by scanning the film, for example, and converts the image into RGB video signals.

For example, the demodulating means converts the video signals into the integral density of the film by referring to a preset conversion table which is previously created by using calibration wedges, converting the integral density into analytical density by effecting a preset matrix operation of 3 rows×3 columns, converting the analytical density into exposure density based on the characteristic curve of the film, effecting a preset exponential operation by using the exposure density to derive an exposure transmittance, and subjecting the exposure transmittance to the matrix operation of 3 rows×3 columns to reproduce colorimetric information of the object. The colorimetric information is a so-called appearance value and faithfully represents the color of the object.

Further, the demodulating means uses information (table or operation equation) indicating a correspondence relation between the exposure density and analytical density previously stored in storing means when the analytical density is converted into exposure density. In this case, exposure density is derived from a reference image previously recorded on a preset area outside a photographing image plane of the color film and deviation in the correspondence relation between the exposure density and the analytical density of a film to be processed and the correspondence information of the storing means may be corrected based on the exposure density of the reference image. By effecting the above process, the color of the object can be faithfully reproduced even if there occurs a variation in the color film before and after execution of the process, for example, a variation in the film not yet used due to humidity and heat, variation in the latent image of the photographed film, processing variation, discoloring of the image after the process, and non-uniformity of photosensitive materials in the manufacturing process.

The output means includes a display unit and a color printer, for example, and effects the aesthetic color correction for the colorimetric signals from the demodulating means and then converts the colorimetric signals into colorimetric signals based on three primary colors (for example, colors of fluorescent materials of RGB of the color CRT) used for image display as reference signals by effecting the matrix operation of 3 rows×3 columns, and the colorimetric signals thus obtained are used to display the image. Further, color dye signals indicating the densities of color materials are derived by converting the colorimetric signals into a logarithm form and subjecting the colorimetric signals converted in the logarithm form to a preset matrix operation of 3 rows×3 columns so as to permit the image to be formed on a media by use of the color printer.

In the film used in the image processing device of this invention, since the colorimetric quality factor of the spectral sensitivity is not less than 0.9, color information of the object can be obtained on the necessary and sufficient condition. Further, since it does not contain a colored coupler, the S/N ratio can be improved when the film is read by use of the input conversion means such as a scanner. In addition, since a DIR is not used, the film structure can be made simple and the latter-half image processing operation can be correctly effected in a simplified manner.

Further, according to the image processing method of this invention, the color (colorimetric color information) of the object can be relatively faithfully fixed on the film and an image having substantially the same colors as those of the object by use of data read from the film can be output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a block diagram showing the construction of a first example of a demodulating processing section shown in FIG. 4;

FIGS. 7A to 7C are diagrams showing examples of conversion tables stored in a conversion table memory 207 shown in FIG. 5 and conversion table memory 217 shown in FIG. 6;

FIGS. 8A to 8C are diagrams showing examples of conversion tables stored in a convention table memory 209 shown in FIG. 5 and conversion table memory 209a shown in FIG. 6;

FIG. 11 is a block diagram showing the construction of a first example of an output circuit shown in FIG. 4;

FIG. 12 is a block diagram showing the construction of a second example of an output circuit shown in FIG. 4; and FIGS. 13A and 13B are flowcharts for illustrating the schematic whole operation of the image processing system.

DETAILED DESCRIPTION OF THE PREFERRED EMBODIMENTS

There will now be described an image processing system according to one embodiment of this invention with reference to the accompanying drawings.

(Explanation for the Principle)

First, the principle of this embodiment is explained.

Desired color light can be matched by adequately mixing three color lights of red, green and blue together. If monochromatic light [λ] of wavelength having unit energy can be matched when mixing [R] color light, [G] color light and [B] color light in the ratio of r:g:b, the following relation can be obtained.

$$1[\lambda]=r[R]+g[G]+b[B] \tag{1}$$

Figure 1:
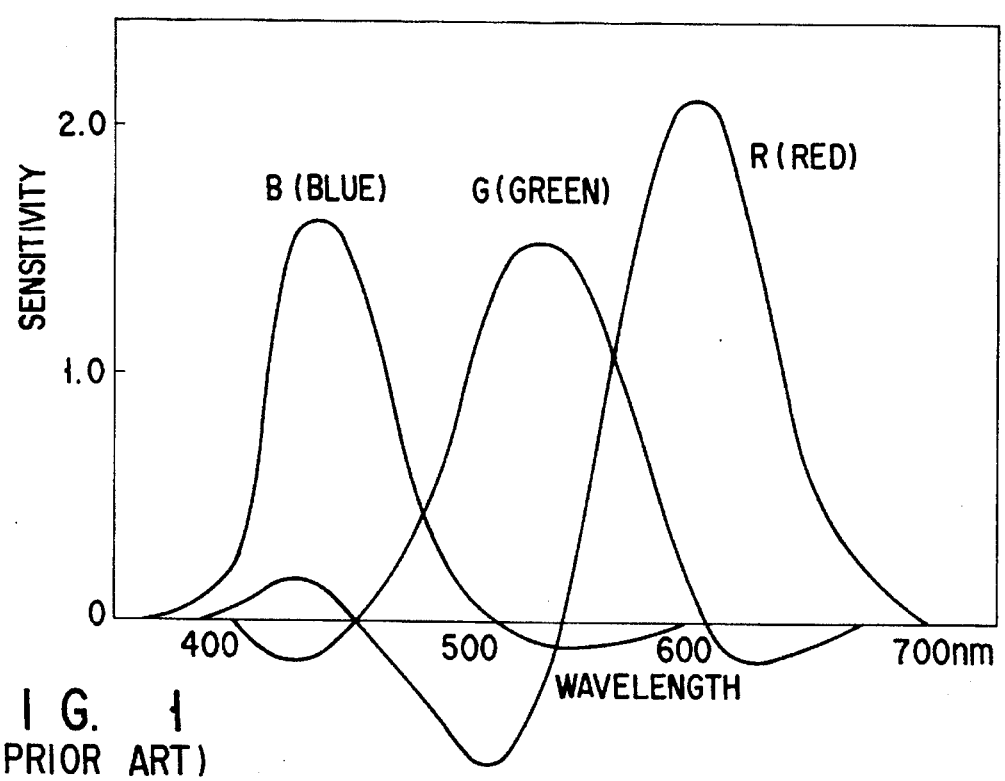
FIG. 1 is a graph showing the person's visual response to light (prior art)

The mixture ratios r, g and b indicate R, G and B components in the monochromatic light [λ]. If the wavelength of the monochromatic light is continuously changed in the visible wavelength range, the mixture ratios r, g and b can be derived as functions of the wavelength. The functions r(λ), g(λ) and b(λ) indicate visual responses and are called color-matching functions shown in FIG. 1.

The ideal spectral sensitivity of a color film is the color-matching function. However, since it is difficult to realize the negative lobes of the color-matching function by use of the color film, the color-matching functions r(λ), g(λ) and b(λ) cannot be used as they are as the spectral sensitivities. Therefore, functions u(λ), v(λ) and w(λ) having only positive values are derived by subjecting the color-matching functions r(λ), g(λ) and b(λ) to the mathematical conversion shown in the equation (2) and are used as the spectral sensitivities.

$$\begin{vmatrix} u(\lambda) \\ v(\lambda) \\ w(\lambda) \end{vmatrix} = \begin{vmatrix} C11 & C12 & C13 \\ C21 & C22 & C23 \\ C31 & C32 & C33 \end{vmatrix} \begin{vmatrix} r(\lambda) \\ g(\lambda) \\ b(\lambda) \end{vmatrix} \tag{2}$$

Primary colors (or reference color stimuli) used in this case are primary colors (imaginary primary colors) which are not actually present, but the matrix elements Cij (i=1, 2, 3, j=1, 2, 3) indicate mixture ratios required for color-matching the imaginary primary colors by use of three primary colors (color lights) of color photographs.

If the functions u(λ), v(λ) and w(λ) are used as the spectral sensitivities of the color film, exposure transmittance (relative exposure amounts with a white point used as a reference) Tu, Tv, Tw can be expressed by the equation (3). In this case, P(λ) indicates the energy distribution of a light source and ρ(λ) indicates the spectral reflectance of the object. The equation (4) can be obtained by substituting the equation (2) into the equation (3).

$$\begin{aligned} Tu &= \int P(\lambda)\rho(\lambda)u(\lambda)d\lambda / \int P(\lambda)u(\lambda)d\lambda \\ Tv &= \int P(\lambda)\rho(\lambda)v(\lambda)d\lambda / \int P(\lambda)v(\lambda)d\lambda \\ Tw &= \int P(\lambda)\rho(\lambda)w(\lambda)d\lambda / \int P(\lambda)w(\lambda)d\lambda \end{aligned} \tag{3}$$

-continued $$\begin{vmatrix} Tu \\ Tv \\ Tw \end{vmatrix} = \begin{vmatrix} C11 & C12 & C13 \\ C21 & C22 & C23 \\ C31 & C32 & C33 \end{vmatrix} \int P(\lambda)\rho(\lambda) \begin{vmatrix} r(\lambda) \\ g(\lambda) \\ b(\lambda) \end{vmatrix} d\lambda \quad (4)$$

The integral portions on the right side of the equation (4) indicates tristimulus values, and if they are expressed by R, G and B, the following equation (5) can be obtained. By solving the equation (5) for R, G and B, the following equation (6) can be derived.

$$\begin{vmatrix} Tu \\ Tv \\ Tw \end{vmatrix} = \begin{vmatrix} C11 & C12 & C13 \\ C21 & C22 & C23 \\ C31 & C32 & C33 \end{vmatrix} \begin{vmatrix} R \\ G \\ B \end{vmatrix} \quad (5)$$

$$\begin{vmatrix} R \\ G \\ B \end{vmatrix} = \begin{vmatrix} C11 & C12 & C13 \\ C21 & C22 & C23 \\ C31 & C32 & C33 \end{vmatrix}^{-1} \begin{vmatrix} Tu \\ Tv \\ Tw \end{vmatrix} \quad (6)$$

The equation (6) indicates that tristimulus values or three appearance values R, G and B of the object can be restored by using the color-matching functions containing only positive values as the spectral sensitivities of the color film and subjecting the exposure transmittance recorded at this time to a preset matrix operation of 3 rows×3 columns.

Figure 2A:
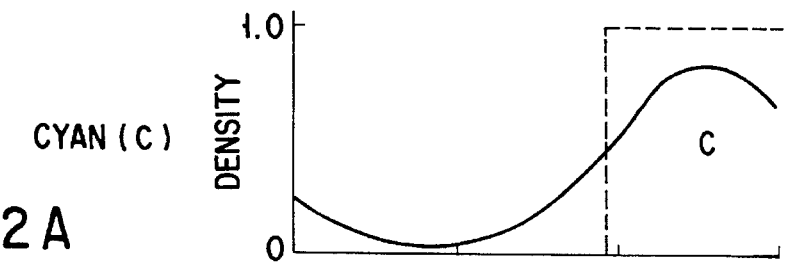
FIGS. 2A to 2C are graphs showing absorption characteristics of block dyes and actual dyes.
Figure 2B:
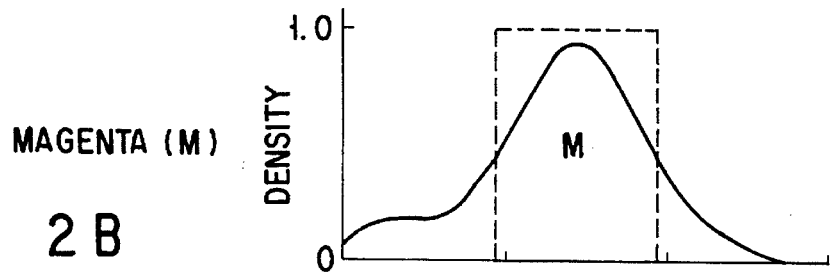
Figure 2C:
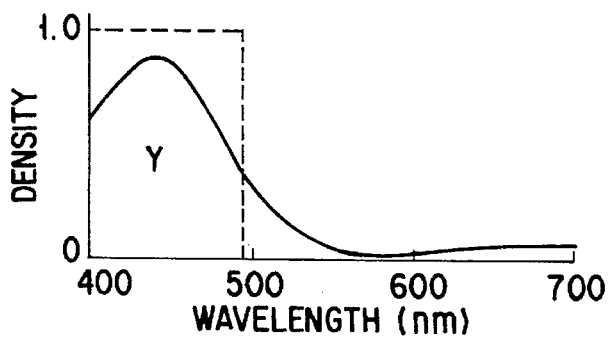

Therefore, in this embodiment, a color negative film having only the positive spectral sensitivities as shown in FIGS. 2A to 2C is used, an image obtained on the color negative film is converted into electrical signals, and the electrical signals are subjected to the conversion from the equation (3) to the equation (6) by a digital image processing device so as to restore tristimulus values (three appearance values R, G and B).

The three appearance values R, G and B of the object thus obtained use the three primary colors of color photographs as primary stimuli. The values can be easily converted to three appearance values using other primary colors as primary stimuli. For example, when an image on the basic negative is displayed on the color CRT, colors of the fluorescent materials of the color CRT are used as primary stimuli and the three appearance values $R_{CR}$, $G_{CR}$ and $B_{CR}$ obtained at this time can be derived according to the equation (7). An object image in which colors (hues) are reproduced with relatively high fidelity can be displayed by displaying the image on the color CRT by using the three appearance values $R_{CR}$, $G_{CR}$ and $B_{CR}$.

$$\begin{vmatrix} RCR \\ GCR \\ BCR \end{vmatrix} = \begin{vmatrix} D11 & D12 & D13 \\ D21 & D22 & D23 \\ D31 & D32 & D33 \end{vmatrix} \begin{vmatrix} R \\ G \\ B \end{vmatrix} \quad (7)$$

Matrix coefficients Dij (i=1, 2, 3, j=1, 2, 3) are coefficients used when the primary colors of the CRT are expressed by adding the three primary colors of the object and can be determined by experiments.

Likewise, a hard copy of the object image can be obtained by using the three appearance values R, G, and B of the object. For example, when an object image is fixed by use of a color laser printer, it is necessary to convert the three appearance values R, G, B of the object into color dye signals (c, m, y) of the color paper. Assuming that the dyes of the color paper are block dyes having ideal absorption characteristics as shown by broken lines in FIGS. 2A to 2C, then the following equation (8) can be obtained.

$$\begin{vmatrix} R \\ G \\ B \end{vmatrix} = \begin{vmatrix} 10^{-c} \\ 10^{-m} \\ 10^{-y} \end{vmatrix} \int P(\lambda) \begin{vmatrix} r(\lambda) \\ g(\lambda) \\ b(\lambda) \end{vmatrix} d\lambda \quad (8)$$

The integral portions of the right side of the equation (8) indicate three appearance values of a white light point, and if they are expressed by RO, GO, BO, then the equation (8) can be rewritten into the following equation (9). Further, the following equation (10) can be derived by modifying the equation (9).

$$\begin{aligned} R &= R_O \cdot 10^{-c} \\ R &= G_O \cdot 10^{-m} \\ B &= B_O \cdot 10^{-y} \end{aligned} \quad (9)$$

$$\begin{vmatrix} c \\ m \\ y \end{vmatrix} = -\log \begin{vmatrix} R/R_0 \\ G/G_0 \\ B/B_0 \end{vmatrix} \quad (10)$$

The actual color dyes of the color paper are not block dyes and indicate smooth absorption curves having inclined portions as shown in FIGS. 2A to 2C. They can be approximately regarded as block dyes having sub-absorption. Therefore, if the densities of the actual dyes are set as c*, m*, y*, then the relation thereof with respect to the densities c, m, y of the block dyes can be approximately expressed by the following equation (11). Further, the following equation (12) can be obtained by substituting the equation (11) into the equation (10).

$$\begin{vmatrix} c \\ m \\ y \end{vmatrix} = \begin{vmatrix} f11 & f12 & f13 \\ f21 & f22 & f23 \\ f31 & f32 & f33 \end{vmatrix} \begin{vmatrix} c* \\ m* \\ y* \end{vmatrix} \quad (11)$$

$$\begin{vmatrix} c* \\ m* \\ y* \end{vmatrix} = - \begin{vmatrix} f11 & f12 & f13 \\ f21 & f22 & f23 \\ f31 & f32 & f33 \end{vmatrix}^{-1} \log \begin{vmatrix} R/R_0 \\ G/G_0 \\ B/B_0 \end{vmatrix} \quad (12)$$

Coefficients fij (i≠j) indicate the rates of the density by sub-absorption with respect to the main density and coefficients fij (i=j) indicate the main densities.

An image in which the color of the object is faithfully represented can be formed on the color paper by supplying the densities c*, m*, y* of the color material derived by the equation (12) to the color laser printer.

(Construction of the Embodiment)

Next, the construction of an image processing system according to this embodiment is explained in detail.

First, a color negative film (basic negative) used in this embodiment is explained.

In this embodiment, the basic negative is used to fix colorimetric information of an object and has an extremely simple structure containing only indispensable elements. That is, the negative of this embodiment is formed such that (a) it does not contain colored couplers (orange mask) and DIR couplers unlike the ordinary color negative, (b) it has a three-layered photosensitive layer, (c) the spectral sensitivity of each photosensitive layer is set as close as possible to a color-matching function (having only positive value), and (d) each photosensitive layer emits a corresponding color which is one of cyan (C), magenta (M) and yellow (Y) according to the exposure amount of the photosensitive layer.

The colored coupler has a function of preventing turbidity of color when a print is formed by use of a normal enlarger.

However, in this embodiment, the amount of light is reduced to lower the S/N ratio when the basic negative is read by a scanner, and therefore, the coupler is not contained in the basic negative.

Further, the DIR (Development Inhibitor Releasing) coupler is a coupler for releasing the development inhibitor. When the coupler is used, the shape of the characteristic curve is changed according to the color of the object and it becomes impossible to determine a curve used as the conversion curve when conversion into exposure density is effected by use of the characteristic curve. Therefore, the basic negative is formed to have a structure containing no DIR coupler.

When it is intended to realize the negative spectral sensitivity by use of the basic negative, the structure of the basic negative becomes complicated. Therefore, in this embodiment, the spectral sensitivity of each of the photosensitive layers of the basic negative is set to have only a positive value. If a condition that colors which are observed as visibly different colors are recorded as the same color on the negative occurs, it becomes impossible to reproduce correct colors even if the colors are subjected to various precise digital image processes. Therefore, the spectral sensitivity of each photosensitive layer of the basic negative is set as close as possible to the color-matching function shown in FIG. 1.

Figure 3:
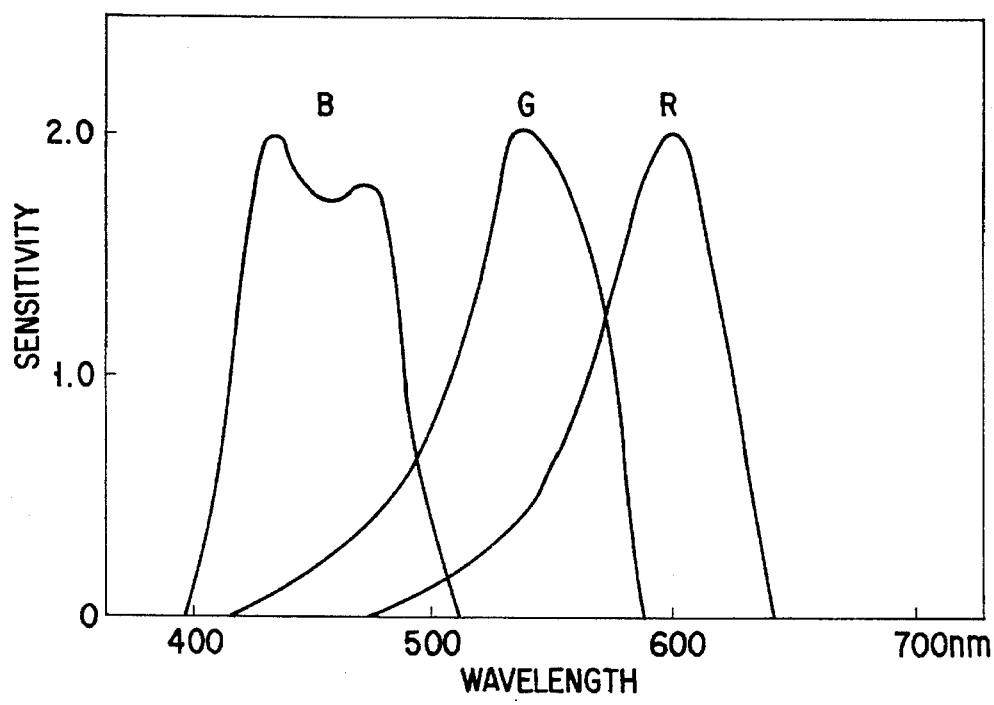
FIG. 3 is a graph showing spectral sensitivity of a color negative film (basic negative) according to a first embodiment of this invention.

One example of the spectral sensitivity of the basic negative is shown in FIG. 3. A colorimetric quality factor (which is also called a q factor) is known as an evaluation scale indicating the degree to which the spectral sensitivity is close to the color-matching function of FIG. 1. The scale indicates that the spectral sensitivity is exactly the same as the color-matching function when the value thereof is 1.0 and that the similarity therebetween is extremely large when the value thereof is equal to or larger than 0.9. The q factor of the basic negative having the spectral sensitivity shown in FIG. 3 is 0.94 in the red sensitive layer, 0.98 in the green sensitive layer, and 0.93 in the blue sensitive layer and is thus larger than 0.9 in each photosensitive layer and can be evaluated that it is sufficiently close to the color-matching function.

(Construction of the Image Processing Device)

Next, the construction of the image processing device according to this embodiment is explained with reference to FIGS. 4 to 12.

Figure 4:
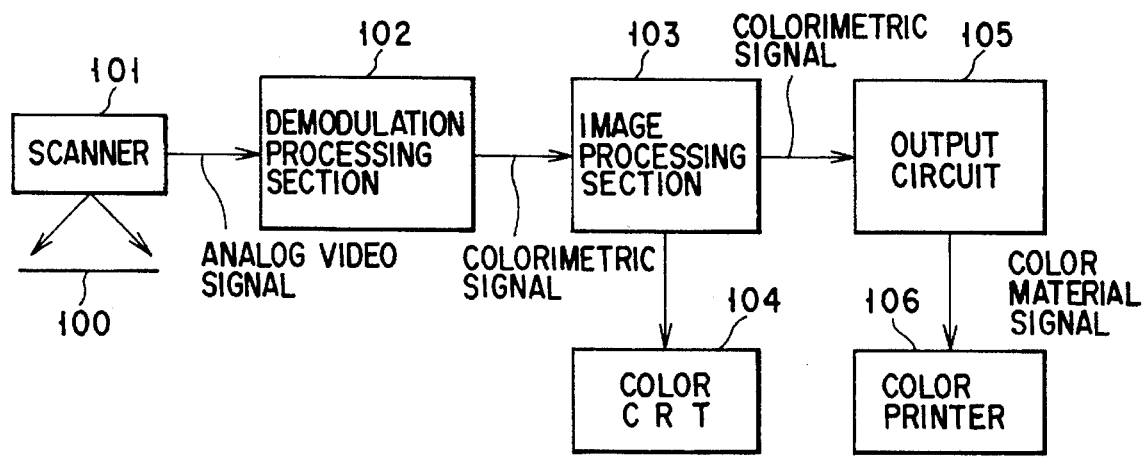
FIG. 4 is a block diagram showing the whole construction of an image processing system according to a first embodiment of this invention.

First, the entire construction is explained with reference to FIG. 4.

An image fixed on a basic negative 100 is converted into R, G and B analog signals for each pixel by use of a scanner 101. As the scanner 101, SG-1000A manufactured by "DAINIPPON SCREEN" Inc. may be used, for example.

The R, G, B analog signals from the scanner 101 are supplied to a demodulation processing section 102. The demodulation processing section 102 converts the R, G, B analog signals into corresponding digital signals which are in turn subjected to the digital processing operation according to the equations (3) to (6) so as to derive colorimetric signals indicating the three appearance signals R, G, B of the object.

The demodulation processing section 102 supplies the colorimetric signals to an image processing section 103. The image processing section 103 converts the three appearance values R, G, B of the object indicated by the supplied colorimetric signals into three appearance values $R_{CR}$, $G_{CR}$ and $B_{CR}$ based on the colors of the fluorescent materials of the color CRT used as primary colors, effects the aesthetic color correction as required, and then supplies the signals to a monitor device such as a color CRT 104 to display an image in which the color of the object is faithfully reproduced. Further, the image processing section 103 converts the three appearance values $R_{CR}$, $G_{CR}$ and $B_{CR}$ subjected to the aesthetic color correction into the three appearance values R, G and B of the object and supplies them to an output circuit 105 for hard copy.

The output circuit 105 selects a color dye signal in response to the three appearance values R, G and B, corrects the color dye signal as required and then supplies the same to a color printer 106. The color printer 106 creates an object image in which the color of the object is faithfully reproduced on color paper according to the color dye signal supplied from the output circuit 105.

Next, the construction of a demodulation processing section 102A which is a first example of the demodulation processing section 102 is explained with reference to FIG. 5. R, G, B analog video signals from the scanner 101 are converted into R, G, B digital signals by means of an A/D converter 201 and then supplied to an integral density converting circuit 202.

A memory 207 stores an R, G, and B conversion tables shown in FIGS. 7A to 7B and indicating the relation between R, G, B digital signals and RGB densities. For example, the conversion tables is previously determined by experiments by using calibration density wedges. A density converter 202 converts R, G, B digital signals into corresponding densities (integral densities) DR, DG, DB by referring to the conversion tables.

The integral densities DR, DG, DB are inconvenient for analysis. Therefore, a matrix operating section 203 subjects an output of the converter 202 to a matrix operation indicated by the following equation (13) by use of matrix coefficients previously stored in a matrix coefficient memory 208 and converts integral densities into analytical densities DC, DM, DY. Coefficients bij constituting the matrix used for the above conversion indicate the ratios of sub-absorption densities to the main densities DC, DM, DY of three color materials used for the basic negative and are derived by measuring the sub-absorption densities by experiments.

$$\begin{vmatrix} DC \\ DM \\ DY \end{vmatrix} = \begin{vmatrix} b11 & b12 & b13 \\ b21 & b22 & b23 \\ b31 & b32 & b33 \end{vmatrix} \begin{vmatrix} DR \\ DG \\ DB \end{vmatrix} \quad (13)$$

The analytical densities DC, DM, DY output from the matrix operating circuit 203 are supplied to an exposure density converting circuit 204. The exposure density converting circuit 204 converts the supplied analytical densities DC, DM, DY into exposure densities Dr, Dg, Db by referring to tables shown in FIGS. 8A to 8C indicating the relation between the analytical densities DC, DM, DY and exposure densities Dr, Dg, Db and stored in a table memory 209 and supplies the exposure densities to an exponential converting circuit 205.

The relation between the analytical densities DC, DM, DY and the exposure densities (exposure amounts) Dr, Dg, Db of each photosensitive layer is a characteristic (which is referred to as a characteristic curve) inherent to the photosensitive material, and in general, it is determined by using a sensitometer or the like. However, since the characteristic curve obtained when a scene is actually photographed often becomes different from the characteristic curve derived by use of the sensitometer because of occurrence of camera flare, a camera-through characteristic curve is used in the demodulation processing section 102A. As shown in FIGS. 8A to 8C, the camera-through characteristic curve can be determined by plotting the relation between the exposure density and analytical density for six achromatic colors of Macbeth Color Checker taken into a frame which is actually photographed. In the basic negative in this embodiment, since the shape of the characteristic curve will not vary according to the color of the object (that is, the rates of colorings of three photosensitive layers), the analytical density can be unconditionally converted into corresponding exposure amount (exposure density) based on the characteristic curve shown in FIG. 9. The table memory 209 stores the characteristic curve of FIG. 9 created in the tables form and stores the corresponding relation between the analytical densities DC, DM, DY and the exposure densities Dr, Dm, Dy for RGB.

The exponential converting circuit 205 effects the operation indicated by the following equation by use of the obtained exposure densities Dr, Dg, Db so as to derive exposure transmission factors Tu, Tv, Tw.

$$Tu=10^{-Dr}, TV=10^{-Dg}, Tw=10^{-Db} \tag{14}$$

An output of the exponential converting circuit 205 is supplied to the matrix operating circuit 206. The matrix operating circuit 206 effects the operation of 3 rows×3 columns indicated by the equation (6) by use of the coefficients stored in the matrix coefficient memory 210 to derive colorimetric signals indicating three appearance values R, G, B of the object.

The values of matrix elements $Cij^{-1}$ stored in the matrix coefficient memory 210 can be easily determined from the relation indicated by the equation (2) if the spectral sensitivity of the basic negative is exactly equal to the color-matching function. However, in practice, the spectral sensitivity of the basic negative is not exactly equal to the color-matching function. Therefore, in order to make three appearance values obtained when converting particular colors, for example, 24 colors of Macbeth Color Checker based on the equation (6) equal to actual three appearance values to the highest degree, the matrix elements $Cij^{-1}$ are derived by the method of least squares and stored in the matrix coefficient memory 210.

Next, the construction of a demodulation processing section 102B which is a second example of the demodulation processing section 102 is explained with reference to FIG. 6. As described before, since the characteristic curve obtained when a scene is actually photographed often becomes different from the characteristic curve derived by use of the sensitometer because of occurrence of camera flare, it is desirable to use a camera-through characteristic curve. However, silver-halide color photosensitive materials are generally weak against heat and moisture, the characteristic curve tends to be distorted before and after the photographing, the control of processing solution is difficult, the characteristic curve may be distorted under a condition of the control of the processing solution, the distortion tends to occur since the image after the processing contains organic coloring matters, and as a result, it is impossible to attain the color reproduction intended when an actual scene is photographed even if a camera-through characteristic curve is previously determined.

Therefore, an exposure meter whose output is adjusted by taking the lens characteristic into consideration is built in the camera, part or all of the characteristic curve is exposed to a specified portion outside the image plane as an image information for each photographing operation, and table information of characteristic values derived from the exposed image information is input to the conversion table memory 209a.

Figure 6:
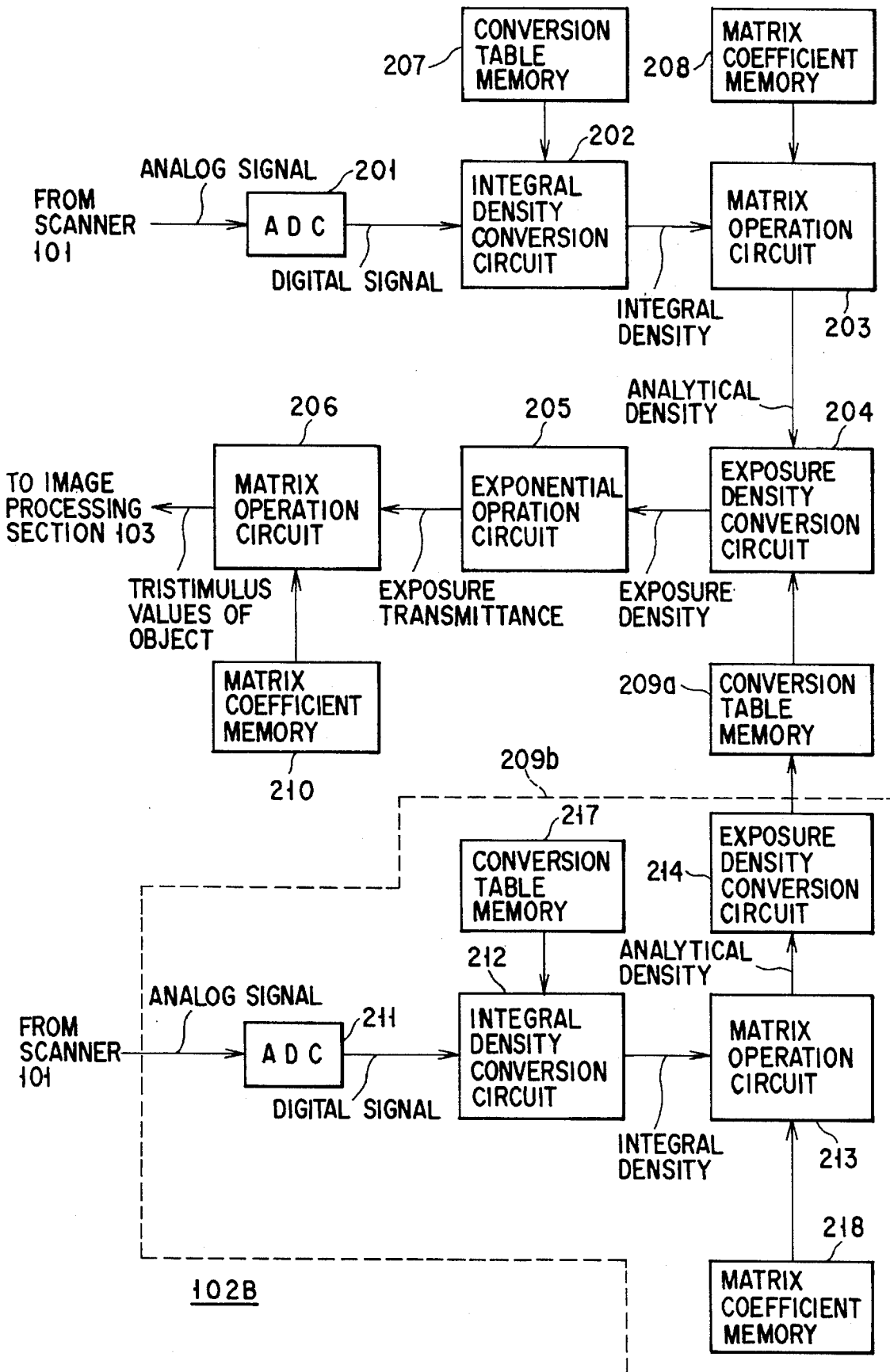
FIG. 6 is a block diagram showing the construction of a second example of a demodulating processing section shown in FIG. 4.

As shown in FIG. 6, the demodulation processing section 102B is additionally provided with a characteristic curve receiving section 209b for supplying table information of characteristic values to the conversion table memory 209 of the above-described demodulation processing section 102A. Portions which effect the same processes as those of the demodulation processing section 102A are denoted by the same reference numerals as those used in the demodulation processing section 102A.

The conversion table memory 209a is supplied with table information of characteristic values from the characteristic curve receiving section 209b. The characteristic curve receiving section 209b includes an A/D converter 211, integral density conversion circuit 212, matrix operating circuit 213, exposure density converting circuit 214, conversion table memory 217, and matrix coefficient memory 218. The A/D converter 211 receives R, G, B analog signals indicating part or all of the characteristic curve previously exposed to a specified portion outside the image plane from the scanner 101, converts the same into R, G, B digital signals and supplies the signals to the integral density converting circuit 212.

The conversion table memory 217 stores a conversion tables as shown in FIGS. 7A to 7C. The integral density converting circuit 217 converts the R, G, B digital signals into corresponding integral densities by referring to the conversion table memory 217. The matrix coefficient memory 218 stores predetermined matrix coefficients, the matrix operating circuit 213 converts the integral density derived by the integral density converting circuit 212 into analytical density by using the matrix coefficient stored in the matrix coefficient memory 218.

The exposure density converting circuit 214 uses the analytical density from the matrix operating circuit 213 to determine whether or not a deviation occurs in the relation between the analytical density and exposure density stored in the conversion table memory 209a, and if there occurs a deviation in the conversion table, the conversion table is adjusted to correct the relation. The other constituents are the same as those of the demodulation processing section 102A described before and the explanation therefor is omitted. Next, the construction of the image processing section 103 is explained with reference to FIG. 10.

Figure 10:
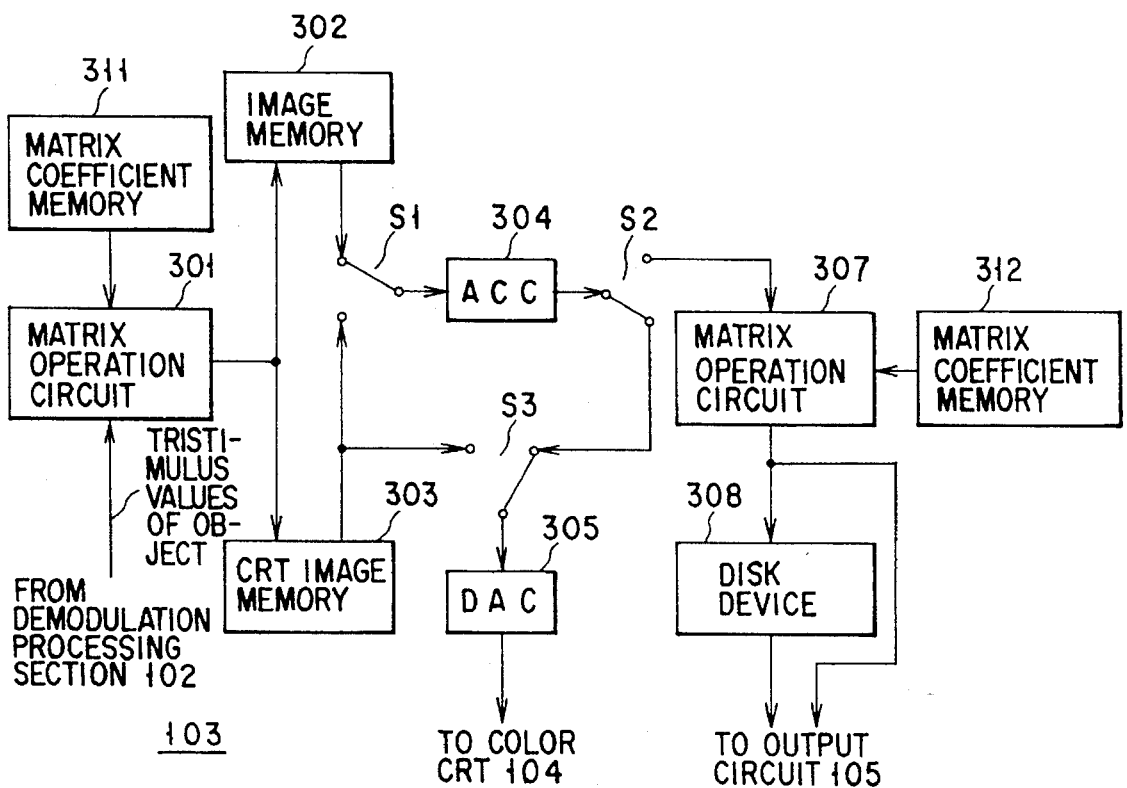
FIG. 10 is a block diagram showing the construction of an image processing section shown in FIG. 4.

In FIG. 10, a colorimetric signal output from the demodulation processing section 102 is supplied to a matrix operation circuit 301. The matrix operation circuit 301 effects the matrix operation of the equation (7) by using matrix coefficients Dij stored in a matrix coefficient memory 311 to derive three appearance values $R_{CR}$, $G_{CR}$ and $B_{CR}$ based on the colors of the three-color fluorescent materials of the color CRT used as primary colors. The matrix coefficient Dij is a coefficient used when each primary color of the color CRT is expressed by the sum of three primary colors of the object and is previously determined by experiments by use of a color chart or the like.

The three appearance values $R_{CR}$, $G_{CR}$ and $B_{CR}$ output from the matrix operating circuit 301 are supplied to an image memory 302 and CRT image memory 303. The image memory 302 stores image data with relatively high resolution, the CRT image memory 303 stores part of the image data stored in the image memory 302 for CRT display and transfers the image data at a standard video speed of 30 frames per second. The image data read out from the CRT image memory 303 is supplied to the CRT 104 via a switch S3 and digital/analog converter 305 and displayed thereon.

Data read out from the CRT image memory 303 or image memory 302 is supplied to an ACC (Aesthetic Color Correction) circuit 304 via a switch S1. As the construction of the ACC circuit 304, the construction which is well known in the art, for example, the construction disclosed in U.S. Pat. No. 4,500,919 can be used.

The three appearance values $R_{CR}$, $G_{CR}$ and $B_{CR}$ which are subjected to the aesthetic color correction process by the ACC circuit 304 are supplied to the digital/analog converter 305 via the switches S2 and S3, converted into analog signals, supplied to the color CRT 104 and displayed thereon.

Image data subjected to the aesthetic color correction process is supplied to the matrix operating circuit 307 via the switch S2. The matrix operating circuit 307 effects an inverse operation of the matrix operation effected by the matrix operating circuit 301 based on matrix coefficients stored in a matrix coefficient memory 312 and converts the three appearance values $R_{CR}$, $G_{CR}$ and $B_{CR}$ which are subjected to the aesthetic color correction process into three appearance values R, G, B. A disk device 308 stores the three appearance values R, G, B supplied from the matrix operating circuit 307.

In the normal state, the switch S1 is connected to the CRT image memory 303, and it is connected to the image memory 302 when image data stored in the image memory 302 is transferred to the disk device 308. In the normal state, the switch S2 is connected to the switch S3, and it is connected to the matrix operating circuit 307 when image data stored in the image memory 302 is transferred to the disk device 308. The switch S3 is connected to the switch S2 in the normal state, and it is connected to the CRT image memory 303 when the aesthetic color correction process is not effected.

Next, the construction of the output circuit 105A is explained with reference to FIG. 11.

In FIG. 11, the three appearance values of the object output from the image processing section 103, that is, an output of the matrix operating circuit 307 or an output of the matrix operating circuit 307 stored in the disk device 308 is supplied to a logarithm circuit 401. The logarithm circuit 401 effects the operation indicated by the equation (10) by use of the three appearance values RO, GO, BO of a white point stored in a reference value memory 402 to derive color material signals (c, m, y) obtained when it is assumed that color dyes of the color paper are block dyes and then supplies the signals to the matrix operating circuit 403.

As described before, the color dyes of the actual color paper are not block dyes. Therefore, the matrix operating circuit 403 effects the operation indicated by the equation (11) by use of the coefficients $fij^{-1}$ stored in a matrix coefficient memory 404 to derive densities c*, m*, y* of actual color dyes. In this case, coefficients fij (i is different from j) indicate the ratios of the sub-absorption densities to the main densities, coefficients fij (i=j) indicate the main densities, the coefficients are previously determined by experiments, and the inverse matrix thereof is derived and the coefficients $fij^{-1}$ thereof are stored in the matrix coefficient memory 404. The densities c*, m*, y, of the color dyes output from the matrix operating circuit 403 are supplied to a correction circuit 405.

In general, an output of the laser printer varies according to various factors (for example, room temperature, history after triggering the laser). Further, even when a preset exposure light is applied to the color paper for development, the output varies and is not constant by various changes in composites of the developing solution. For this reason, in order to correctly attain the desired density, it becomes necessary to expose and develop a test pattern, measure the output of the test pattern by use of a densitometer and adjust the laser light amount of the laser printer so as to obtain a correct output. Then, the correction circuit 405 adequately corrects the densities c*, m*, y* based on measurement data of the densitometer and supplies the corrected data to the color printer 106.

The color printer 106 creates an image in which the color of the object is faithfully reproduced on the color paper in response to an output of the correction circuit 405.

(Operation)

Figure 13A:
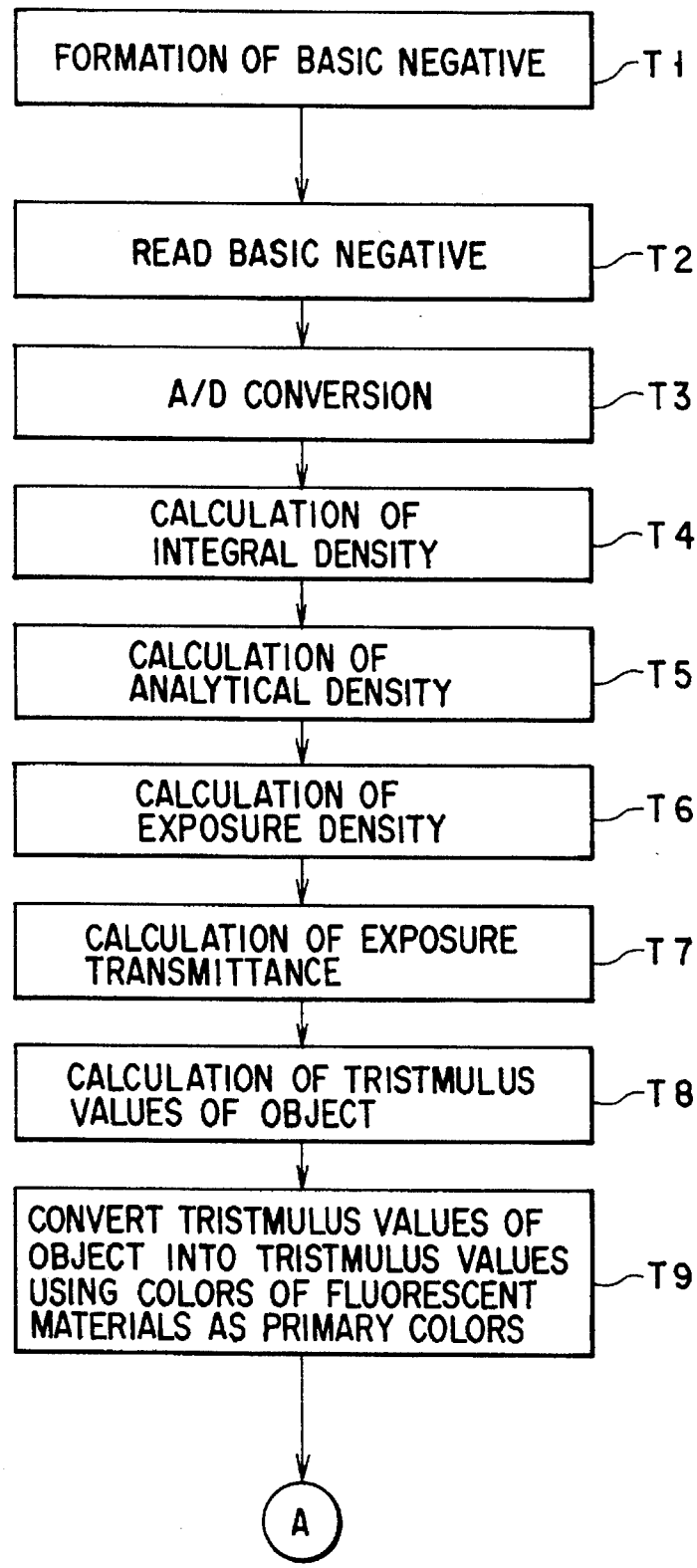

A sequence of operations from acquisition of an image by the image processing system with the above construction to display of the image on the color CRT 104, formation of hard copy by the color printer 106 may be expressed by the flowchart shown in FIGS. 13A and 13B. Next, the operation is explained with reference to FIGS. 13A and 13B. In this case, as the demodulation processing section 102, the demodulation processing section 102A shown in FIG. 5 is used.

First, an object is photographed and developed to fix the object image on the basic negative (step T1). The operation is effected outside the image processing system.

Next, the image fixed on the basic negative is converted into R, G, B analog signals for each pixel by use of the scanner 101 (step T2). An output of the scanner 101 is converted into digital signals for ROB by use of the A/D converter 201 (step T3).

The density converter 202 converts R, G, B digital signals into corresponding integral densities DR, DG, DB by referring to the conversion table (FIG. 7) stored in the table memory 207 (step T4). The matrix operating circuit 203 subjects the integral densities DR, DG, DB to the matrix operation of 3 rows×3 columns by use of the matrix coefficients stored in the matrix coefficient memory 208 to derive analytical densities DC, DM, DY (step T5).

The exposure density converting circuit 204 converts the analytical densities DC, DM, DY into exposure densities Dr, Dg, Db by referring to the conversion table (FIG. 8) stored in the table memory 209 (step T6).

The exponential operation circuit 205 derives exposure transmittance $Tu(=10^{-DR})$, $Tv(=10^{-Dg})$, $Tw(=10^{-Db})$ by use of the exposure densities Dr, Dg, Db (step T7).

The matrix operating circuit 206 effects the matrix operation of 3 rows×3 columns indicated by the equation (6) for the exposure transmission factors Tu, Tv, Tw by use of the matrix coefficients stored in the matrix coefficient memory 210 so as to derive three appearance values R, G, B of the object (step T8).

The three appearance values R, G, B are supplied to the matrix operating circuit 301 and converted into three appearance values $R_{CR}$, $G_{CR}$, $B_{CR}$ based three-color fluorescent materials of the color CRT used as primary colors (step T9).

When the aesthetic color correction process is not effected, the three appearance values $R_{CR}$, $G_{CR}$, $B_{CR}$ are supplied to the DAC 305 via the switch S3 after temporarily stored in the CRT image memory 303, converted into digital data (step T10), supplied to the color CRT 104 and displayed thereon (step T11). As a result, an object image in which the color of the object is faithfully reproduced is displayed on the color CRT 104.

On the other hand, when the aesthetic color correction process is effected, one of the image memories 302 and 303 is selected by use of the switch S1 and data read out from the selected memory is subjected to a desired color correction process by means of the ACC circuit 304 (step T12). If necessary, data after subjected to the color correction process is supplied to the color CRT 104 via the DAC 305 to display the object image whose color is corrected (step T13).

Further, if necessary, image data after subjected to the color correction is supplied to the matrix operating circuit 307 and converted into three primary colors R, G, B of the object and then stored in the disk device 307.

Further, if necessary, image data after subjected to the color correction is supplied to the matrix operating circuit 307 and the three primary colors R, G, B of the object supplied directly from the matrix operating circuit 307 or from the matrix operating circuit 307 via the disk device 308 are supplied to the output circuit 105, converted into color dye signals of the color paper (T14), and the color dye signal is subjected to an adequate correction process (T15). The color printer 106 creates an image in which the color (hue) of the object is faithfully reproduced on the color paper (T16).

As described above, according to this embodiment, an image in which the color of the object is faithfully reproduced can be displayed on the color CRT 104 and created on color paper by the color printer 106.

Further, in the operation described before, the demodulation processing section 102A of the first example is used as the demodulation processing section 102, but when the demodulation processing section 102B is used, it is only required that the table in the conversion table memory 209 should be adjusted by the characteristic curve reading section 209b before the calculation (T6) of exposure density is effected. As a result, when the demodulation processing section 102B is used, an image in which the color of the object is faithfully reproduced can be obtained even when the characteristic curve for the photosensitive material is distorted for various reasons.

This invention is not limited to the above embodiment.

For example, in the above embodiment, the basic negative is formed of three photosensitive layers and each photosensitive layer develops one of the colors C, M and Y according to the exposure amount, but it is also possible to use a film formed of four or five layers and develop two or more colors in each photosensitive layer. Further, the spectral sensitivity of each photosensitive layer is not limited to that shown in FIG. 3, but it is possible to use a film having another spectral sensitivity. However, in this case, it is desired that the spectral sensitivity should be as close as possible to the color-matching function which is the person's visual response to light shown in FIG. 1, particularly, the q factor thereof should be equal to or larger than 0.9.

In the construction of FIG. 5, the operation of converting an output of the scanner 101 into three appearance values R, G and B is effected by use of a plurality of circuit blocks, but it is also possible to effect all the operations by use of a single operation processor according to a software, for example.

Figure 9:
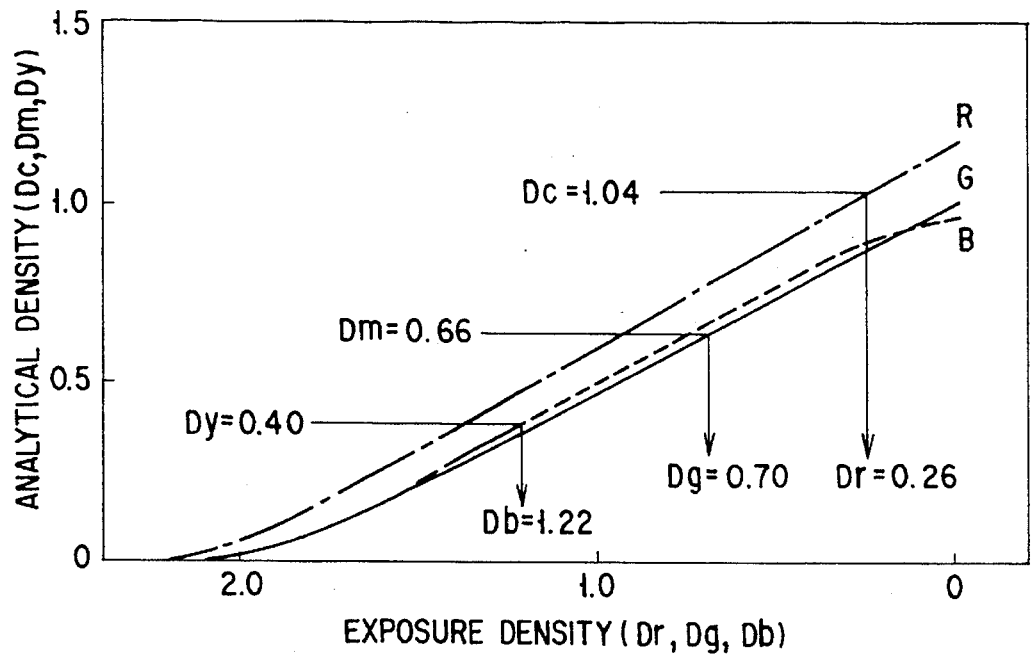
FIG. 9 is a graph showing the characteristic curve showing the relation between the analytical density and exposure density.

Further, in the construction of FIG. 5, the exposure density converting circuit 204 converts the analytical density into exposure density based on the table stored in the exposure density conversion table memory 209, but it is also possible to derive a preset relation from the characteristic curve shown in FIG. 9 and derive exposure density based on the relation.

Further, in FIG. 11, the logarithm circuit 401 effects the operation indicated by the equation (10), but it is also possible to provide look-up tables indicating the relation between an output of the image processing section 103 and densities c, m and y of the block dye and convert the output of the image processing section 103 into the densities c, m and y of the block dye by referring to the tables. FIG. 12 is a block diagram showing the construction of a second example of output circuit 105B using conversion table memory 501 which stores the look-up tables. In FIG. 12, portions which effect the same processes as those of the output circuit 105A shown in FIG. 11, are denoted by the same reference numerals as those used in the output circuit 105A. The look-up tables stored in the conversion table memory 501 indicate the relation between tristimulus values (three appearance values R, G, and B) and densities c, m, and y of the block dye. The relation can be derived by using the equation (10).

It is also possible to omit the switch S2 from the construction of FIG. 10, always connect the output terminal of the ACC circuit 304 directly to the DAC 305 and matrix operating circuit 307 so as to always supply image data which has been subjected to the aesthetic color correction to the above circuits. Further, it is possible to design the ACC circuit 304 to be selectively set in the ON or OFF state, and supply image data which is not subjected to the aesthetic color correction to the matrix operating circuit 307 and DAC circuit 305.

In the above embodiment, the matrix operating circuit 307 converts the received image data into three appearance values R, G, B of the object, but it is possible to convert the image data into another data and store the thus converted data in the disk device 308. For example, the image data may be converted into XYZ three appearance values using X, Y, Z primary colors recommended by the International Commission on Illumination as primary stimuli and other colorimetric values derived from the XYZ three appearance values. The above values are not numerals inherent to the actual device of system but are universal numerals, and if the values are stored in the disk device 308, it is effective for signal transfer between desired media. The color printer 106 is not limited to the laser printer, but a thermal transfer printer, electrophotographic printer, ink jet printer or the like may be used.

Further, when the demodulation processing section 102B is used, the reference image (characteristic curve) is previously recorded in a specified portion outside the photographing image plane of the film at substantially the same time as the photographing operation, but the reference image may be exposed at the time of manufacturing the photosensitive materials or before development. Further, the stability of or variation in the characteristic curve of the photosensitive material can be recognized by the above processes.

As described above, according to this invention, since the negative is mainly used to effect the image taking function and the color correction process is effected by use of the digital image processing device, the structure of the film can be made simple, and an image in which the color of the object is faithfully reproduced can be obtained. Further, a desired image can be reproduced even when the characteristic curve for the photosensitive material is distorted for various reasons, thereby enhancing the reliability of the system.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing system comprising:
   input converting means for reading an image of an object fixed on a film and converting the image into a corresponding signal;
   demodulating means connected to said input converting means, for demodulating a colorimetric signal indicating colorimetric information of the object in response to the signal in accordance with the characteristics of the spectral sensitivities of the film; and
   output means connected to said demodulating means, for outputting an image having substantially the same color as that of the object based on the colorimetric signal.

2. The system according to claim 1, wherein said demodulating means includes:
   means for converting an output signal of said input converting means into the integral density of the film;
   means for subjecting the integral density to a preset matrix operation of 3 rows×3 columns to convert the integral density into an analytical density;
   exposure density converting means for converting said analytical density into exposure density based on the characteristic curve of said film;
   means for effecting a preset exponential operation by use of said exposure density to derive an exposure transmittance; and
   means for subjecting said exposure transmittance to a preset matrix operation of 3 rows×3 columns.

3. The system according to claim 2, wherein said output means includes at least one of a display device for displaying an image having substantially the same color as the color of the object in response to said colorimetric signal and a printer for creating an image having substantially the same color as the color of the object on a preset output medium.

4. The system according to claim 2, wherein said output means includes:
   means for converting the colorimetric signal from said demodulating means into a colorimetric signal based on three primary colors used for image creation of said output means as a reference;
   means for storing the thus converted colorimetric signal; and
   means for outputting an image according to a converted colorimetric signal read out from said storing means.

5. The system according to claim 2, wherein said output means includes:
   means for converting said colorimetric signal into a logarithm form; and
   means for subjecting the colorimetric signal converted into the logarithm form to a matrix operation of 3 rows×3 columns to derive a color dye signal indicating the densities of color dyes forming an output image.

6. The system according to claim 2, wherein said output means includes:
   a table indicating the relation between said colorimetric signal and said color dye signal; and
   means for converting the colorimetric signal into the colorimetric signal by referring to the table.

7. The system according to claim 2, wherein said output means further includes aesthetics color correction means for subjecting said colorimetric signal to an aesthetic color correction process.

8. The system according to claim 1, wherein said demodulating means includes means for converting a signal from said input converting means into a signal indicating the exposure transmittance of the object; and matrix operating means for subjecting the signal indicating the exposure transmittance to a preset matrix operation of 3 rows×3 columns to demodulate said colorimetric signal indicating the colorimetric information of the object.

9. The system according to claim 8, wherein said exposure density converting means of said demodulating means includes:
   storing means for storing information indicating the relation between analytical density and exposure density based on the characteristic curve of said film;
   adjusting means for reading reference information from the characteristic curve information of said film previously stored in an area outside the photographing image plane of said film and adjusting the relation between said exposure density and said analytical density of said storing means based on the reference information; and
   means for converting the analytical density derived by said matrix operation into exposure density by referring to said relation indicating information of said storing means.

10. The system according to claim 9, wherein said output means includes at least one of a display device for displaying an image having substantially the same color as the color of the object in response to said colorimetric signal and a printer for creating an image having substantially the same color as the color of the object on a preset output medium.

11. The system according to claim 9, wherein said output means includes:
    means for converting the colorimetric signal from said demodulating means into a colorimetric signal based on three primary colors used for image creation of said output means as a reference;
    means for storing the thus converted colorimetric signal; and
    means for outputting an image according to a converted colorimetric signal read out from said storing means.

12. The system according to claim 9, wherein said output means includes:
    means for converting said colorimetric signal into a logarithm form; and
    means for subjecting the colorimetric signal converted into the logarithm form to a matrix operation of 3 rows×3 columns to derive a color dye signal indicating the densities of color dyes forming an output image.

13. The system according to claim 9, wherein said output means includes:
    a table indicating the relation between said colorimetric signal and said color dye signal; and
    means for converting the colorimetric signal into the colorimetric signal by referring to the table.

14. The system according to claim 9, wherein said output means further includes aesthetic color correction means for subjecting said colorimetric signal to an aesthetic color correction process.

15. The system according to claim 1, wherein said demodulating means demodulates the colorimetric signal in accordance with the characteristics of the spectral sensitivities of the film and characteristic curve of the photosensitive material.

* * * * *